TRANSISTOR OSCILLATORS

Filed Sept. 23, 1953

INVENTOR.
GEORGE C. SZIKLAI

BY [signature]

ATTORNEY

United States Patent Office 2,812,437

Patented Nov. 5, 1957

2,812,437

TRANSISTOR OSCILLATORS

George C. Sziklai, Princeton, N. J., assignor to Radio Corporation of America, a corporation of Delaware Application September 23, 1953, Serial No. 381,934

7 Claims. (Cl. 250—36)

This invention relates generally to transistor oscillators, and, more particularly, to novel oscillation circuits utilizing transistors to provide an efficient self-excited source of sawtooth current waves.

The present invention utilizes the bidirectional current characteristics of transistors disclosed in my co-pending application Ser. No. 308,618, filed September 9, 1952, now Patent No. 2,728,857, dated December 27, 1955, and entitled "Electronic Switching," and the opposite input signal polarity requirements of n–p–n and p–n–p transistors disclosed in my copending application Ser. No. 319,401, filed November 7, 1952, and now Patent No. 2,791,644, issued May 7, 1957. In the aforesaid co-pending application entitled "Electronic Switching" it was revealed that a transistor may function satisfactorily as a high-speed bidirectional switch. Reversals of the direction of bias applied to the intermediate zone of a p–n–p or n–p–n junction transistor will effect the "opening" or "closing" of a utilization circuit connected between the two end zones. It was further noted that when the direction of the bias was such that the utilization circuit was closed, current may flow in either direction between the end zones, depending upon voltage and current conditions in the utilization circuit. In a particular embodiment of the aforesaid invention, a transistor functioning as a bidirectional switch is utilized to periodically open and close a circuit including an inductance coil and a D.-C. source. When bias on the transistor is such as to first close this circuit, current flowing through the inductance coil increases at a substantially linear rate. When the bias is reversed, as under the influence of a suitable trigger pulse, the circuit is opened and the inductance coil is permitted to resonate with its shunt capacity for ½ of an oscillation cycle. As bias then returns to its normal polarity, current flows in the inductance coil in the opposite direction, now decreasing at a linear rate until current equilibrium is reached. The functional cycle then recommences with current flow throughout the inductance coil in the original direction, again increasing at a substantially linear rate. The current generated in the inductance coil thus has a substantially sawtooth waveform. The generation of this sawtooth waveform is markedly efficient, since substantially all of the energy from the D.-C. source which is stored in the inductance during a portion of the operating cycle is returned to the source during a later portion of the operating cycle.

The present invention is directed toward a sawtooth current source of the above described bidirectional switch type, which, however, is self-excited rather than externally triggered. In accordance with the present invention, self-excitation of the sawtooth current source is obtained by utilizing "flyback" pulses derived from the inductance coil to effect the "triggering." In accordance with a particular embodiment of the present invention a pair of bidirectionally conducting transistors in series, each acting as a bidirectional high speed switch, are employed with respective "triggering pulses" therefor obtained from opposite ends of the inductive load. A particular advantage of this embodiment over the sawtooth current generator disclosed in my aforesaid co-pending application is that the full flyback voltage developed across the inductance coil does not appear across the end zones of a switching transistor since two transistors in series are employed. This may be of importance in certain applications since the Zener (breakdown) voltage of the transistors is limited.

In the particular embodiment referred to above the two series transistors employed are of opposite conductivity types. However, in view of the opposite input signal polarity requirements of n–p–n and p–n–p transistors referred to in my aforementioned co-pending application entitled "A Transistor Amplifier," similar cutoff action is obtained for each transistor when the triggering pulses from the opposite ends of the inductive load are respectively applied thereto.

Accordingly it is a primary object of the present invention to provide a novel transistor oscillator.

It is a further object of the present invention to provide an efficient self-excited sawtooth current wave source.

It is an additional object of the present invention to provide a novel and improved transistor sawtooth current oscillator.

It is another object of the present invention to provide an improved transistor switching circuit for generating sawtooth current waveforms in an inductive load with a reduced kick-back voltage appearing across the switching transistor.

Other objects and advantages of the present invention will become apparent to those skilled in the art upon a reading of the following detailed description and an inspection of the accompanying drawing in which.

Figure 1:
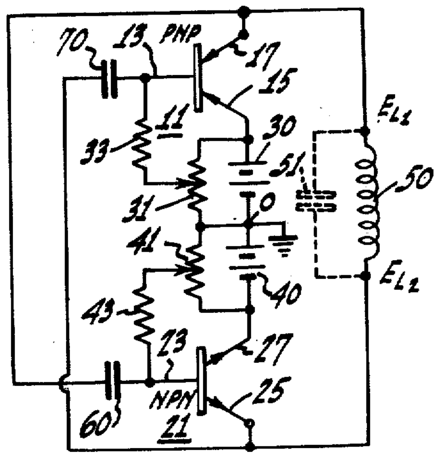
Fig. 1 illustrates schematically a sawtooth current oscillator utilizing a pair of transistors of opposite conductivity types in accordance with an embodiment of the present invention.

Referring to Fig. 1 in greater detail, a pair of junction transistors 11 and 21 are illustrated. The transistor 11, of the p–n–p type, is provided with a conventional base electrode 13, and a pair of additional electrodes 15 and 17 in ohmic contact with the respective p-type end zones of the transistor. In conventional unidirectional use of the transistor one of these electrodes serves to inject charge carriers (holes, in the p–n–p transistor) and is called the "emitter," and the other serves to collect the holes and is termed the "collector." However in bidirectional utilizations of the transistor, such as described in my aforementioned co-pending application, each of the electrodes 15 and 17 serves alternatively as emitter and collector, and the conventional terms are therefore not particularly appropriate. While an appellation such as "emitter-collector" would be more apt for both for the sake of convenience in description the electrode 15 will be referred to as the emitter and electrode 17 will be referred to as the collector.

Similarly the transistor 21, of the n–p–n type, is provided with a base electrode 23 and a pair of additional electrodes 25 and 27, in ohmic contact with the respective n-type end zones of the transistor, which electrodes will be referred to as collector and emitter, respectively, although the same inappropriateness of the terminology should be noted.

Figure 2:
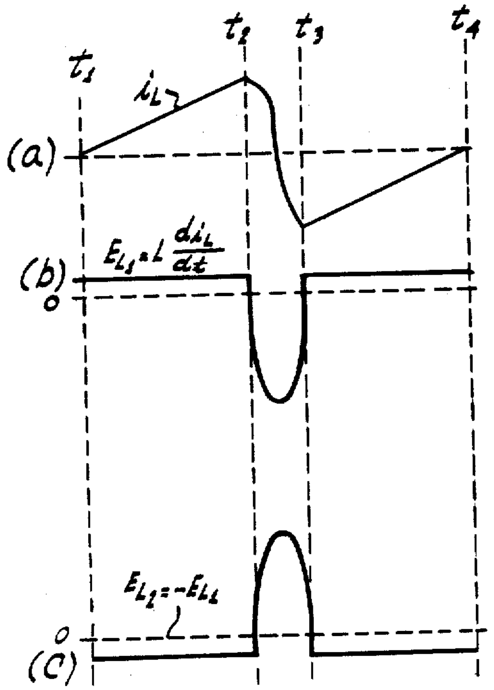
Fig. 2 illustrates graphically current and voltage waveforms associated with the operation of the sawtooth oscillator illustrated in Fig. 1.

Operating voltages for the respective emitters 15 and 27 are provided by the batteries 30 and 40, battery 30 providing the emitter 15 with an operating potential more positive than the reference potential of the intermediate point "O" (which is illustrated as at ground potential), and battery 40 providing the emitter 27 with an operating potential more negative than this reference potential. The base 13 of the transistor 11 is normally provided with a bias in a forward direction by its connection via resistor 33 to a tap on the bleeder 31 shunting the battery 30. Similarly base 23 of the transistor 21 is normally provided with a bias in the forward direction by its connection via resistor 43 to a tap on the bleeder 41 shunting the battery 40. An inductive load 50 is connected between the respective collector electrodes 17 and 25. The capacitor 51, illustrated in dotted lines as shunting the coil 50, represents the distributed capacity of the coil (and any other circuit capacities shunting the coil). The collector 17 is capacitively coupled to the base 23 of the transistor 21 by means of the capacitor 60, while the collector 25 is capacitively coupled to the base 13 of the transistor 11 by means of the capacitor 70. The operation of the above described circuit may best be explained in conjunction with the waveforms illustrated in Fig. 2. Waveform (*a*) represents the current $i_L$ flowing through the coil 50, the portion of the illustrated curve appearing above the axis indicating current flow in a direction out of collector 17 and into collector 25. Waveform (*b*) represents the potential $E_{L_1}$ at the end of coil 50 to which collector 17 is connected, the axis labeled "*o*" representing the reference potential of point "O." Waveform (*c*) represents the potential $E_{L_2}$ at the end of coil 50 to which collector 25 is connected, axis "*o*" again representing the reference potential.

At the start of operation (time $t_1$), the bias on the respective bases 13 and 23 is in a forward direction so as to close the emitter-collector paths of both transistors. A load circuit is thus closed which includes, in series, batteries 30 and 40, the emitter-collector paths of the transistors 11 and 21, and the coil 50. Current flow through the coil 50 is in a direction from collector 17 to collector 25, and increases substantially linearly with time, assuming a negligible amount of resistance in the reactive load circuit. Since the voltage developed across the coil 50 is the first derivative of the current flowing therethrough, it remains substantially constant as the coil current increases linearly, and the potentials represented by curves (*b*) and (*c*) remain substantially fixed.

There is however a definite upper limit to the current which may flow through the coil 50, i. e. there is a maximum current amplitude which the emitter-collector paths of the transistors 11 and 21 may support as determined by their base biases. As the current approaches this limit at time $t_2$ and thus ceases its linear rate of increase, the potential at the collector 17 end of the coil 50 departs from its quiescent level and swings negatively. The negative pulse developed at collector 17 is coupled via capacitor 60 to the base 23 of the n-p-n transistor 21, tending to drive this transistor to cutoff. Similarly as collector 25 swings positively as the current limit is approached, the positive pulse thus developed is applied via capacitor 70 to the base 13 of the p–n–p transistor 11, tending to drive that transistor also to cutoff. When the emitter-collector paths of the transistors 11 and 21 are thus opened by the cutoff action of the cross-coupled feedback pulses, the coil 50 is effectively disconnected from the energy sources 30 and 40 and is left free to resonate with its shunt capacity 51.

During the time interval $t_2$–$t_3$, the current through coil 50 passes through a half cycle of oscillation, being at a maximum in the direction opposite to the original direction of coil current flow at time $t_3$. During the same time interval, the voltage developed across coil 50 has also swung through a half cycle of oscillation (which is effectively 90° out of phase with the current oscillation), and the potentials at collectors 17 and 25 are thus returned by time $t_3$ to the original level. The cutoff pulses fed back to the respective bases 13 and 23 thus effectively terminate at time $t_3$, and the emitter-collector paths of transistors 11 and 21 are thus returned to a conducting condition at time $t_3$. However since at time $t_3$, the coil current is finite, at an amplitude substantially corresponding to the maximum amplitude at $t_2$ but opposite in direction to the original direction, it requires a finite time interval to return to zero. Current therefore flows in the newly closed load circuit in a direction from collector 25 to collector 17, this current decreasing in amplitude with time until at time $t_4$ current equilibrium is reached. It should be noted that, as in my aforementioned co-pending application, energy is returned to the sources 30 and 40 during this $t_3$–$t_4$ time interval. At time $t_4$ the operating cycle recommences, with the sources 30 and 40 delivering a current linearly increasing with time and flowing in the original direction.

The self-excited arrangement of Fig. 1 is thus seen to be a sawtooth current wave source of an order of efficiency comparable to the triggered source disclosed in my aforementioned co-pending application, since the energy from sources 30 to 40 which is stored in the inductance 50 during the $t_1$–$t_2$ portion of the operating cycle is returned to the sources during the $t_3$–$t_4$ portion of the operating cycle. It may also be noted that the full flyback voltage developed across coil 50 during the open circuit ($t_2$–$t_3$) time interval does not appear across the emitter-collector path of one switching transistor, but rather is effectively divided so that approximately half of the flyback voltage appears across the emitter-collector path of each of the transistors 11 and 21. This is of practical significance since the Zener (breakdown) voltage of the transistors is a definite design limitation in utilizations such as have been described. Thus, for example, where the sawtooth generator disclosed in my aforementioned co-pending application is utilized in the horizontal deflection system of a television receiver, design of the receiver's high voltage supply (conventionally developed from flyback pulses) must take into consideration the maximum permissible voltage across the switching transistor. In contrast with a system where the full flyback voltage appears across one transistor, the present invention wherein only approximately half of the flyback voltage appears across any one transistor is permissive of a substantially higher flyback voltage limit.

The duration of the flyback time interval is determined by the resonance period for the coil 50 and its shunt capacity 51. While self-resonance with the coil's distributed capacity alone has been indicated on the drawing, it will be readily appreciated that a lumped capacitance may additionally be shunted across the coil 50 to alter the "open circuit" resonant frequency to an otherwise desired value.

It may be noted, in connection with the previous statements on terminology appropriate for the electrodes 15, 17, 25 and 27, that the collectors 17 and 25 truly serve as "collectors" in the above described operation during the $t_1$–$t_2$ portion of the operating cycle. However, during the $t_3$–$t_4$ portion of the operating cycle, when energy is returned to the sources 30 and 40, the collectors 17 and 25 effectively serve as "emitters."

As in the sawtooth current generator of my aforementioned co-pending application, it is desirable that the bidirectional switch transistors 11 and 21 be "symmetrical" transistors: i. e. transistors in which the control current-load current characteristic for one direction of flow of load current is essentially symmetrical with the control current-load current characteristic for the opposite direction of flow of load current. Not all junction transistors attain this condition of symmetry; primarily as a consequence of the particular procedure employed in their fabrication of development, some junction transistors present a substantially greater impedance to current flow in one direction between the outer zones, for a given set of bias conditions, than they present to current flow in the opposite direction between the outer zones under equivalent bias conditions.

While there are many contributing factors which may determine the presence or lack of symmetry in the aforementioned characteristics of the junction transistor, it is believed by the applicant that if the resistivities of the two outer zones are substantially equal and if the two junctions are symmetrical (i. e., if the junction between the one outer zone and the intermediate zone is substantially equal in magnitude or extent to the junction between the other outer zone and the intermediate zone), a sufficient degree of symmetry in these current characteristics may be achieved to permit consideration of the unit as a "symmetrical" junction transistor.

It should not, however, be considered that the present invention is limited to the use of "symmetrical" transistors, for in many types of utilization a considerable amount of asymmetry may be tolerated. Also it may be noted that, since the emitter-collector paths of the two transistors in the present invention are in series during the closed circuit portions of the operating cycle, a symmetrical effect may be obtained using two transistors with similar characteristic asymmetries provided one is reversed from its "normal" connection to effectively balance the asymmetries. Similarly, it may be noted that a pair of "asymmetrical" transistors, both of the same type and having similar asymmetries in their control current-load current characteristics, with their respective emitter-collector paths connected in reverse parallel relations, effectively provide the equivalent of the emitter-collector path of a "symmetrical" transistor.

While the present invention has been particularly described with relation to the use of junction transistors, it is also believed that embodiments employing transistors of the so-called point-contact type with circuit and electrode connections similar to those illustrated are also feasible. However, in order to obtain the necessary bidirectional conduction effects, it is believed that it may be necessary to either "form" both emitter and collector electrodes, or to abstain from forming either. But where the available point-contact transistor units have a tendency toward instability in a base input type of circuit arrangement, the embodiments employing transistors of the junction type will be preferable.

While useful wherever sawtooth current waves are required, the circuits of the present invention should prove of significant utility in systems such as deflection systems associated with the operation of cathode ray tubes. In this connection, it may be noted that whereas the system illustrated in Fig. 1 constitutes a self-excited sawtooth wave generator, its operation is readily susceptible to synchronization with some external source or wave, as by application of suitable synchronizing pulses to the respective bases.

Having thus described my invention, what I claim is:

1. An oscillator comprising the combination of a pair of transistors of opposite conductivity types, each of said transistors having a base electrode, each of said transistors providing a current path of controllable conductivity, an inductive load, an energy source, biasing means coupled to said base electrode for normally rendering both said current paths conducting, means including said current paths as for coupling said inductive load to said energy source when said current paths are conducting and decoupling said load and said energy source when said current paths are rendered nonconducting, and means coupled to said base electrodes and responsive to the voltage developed in said inductive load for periodically rendering both said current paths simultaneously nonconducting.

2. Apparatus for generating sawtooth current waves comprising in combination a pair of semiconductor devices each having an input electrode, an output electrode and a common electrode, and each having a current path of controllable conductivity between its common electrode and its output electrode, an inductance coil, a current source, respective biasing means coupled to each input electrode for normally rendering both said current paths conductive, said current paths being connected in series with said coil and said source, and respective feedback couplings between said coil and each input electrode for periodically rendering both said current paths simultaneously nonconducting.

3. A sawtooth wave oscillator comprising the combination of a pair of transistors of mutually opposite conductivity types, each of said transistors having a base electrode and pair of additional electrodes, an inductance, an energy source, means for coupling said inductance and said source to said additional electrodes such that the current path in each transistor between said additional electrodes is in series with said inductance, said source and the corresponding current path of the other transistor, and means for capacitively coupling opposite ends of said inductance to the respective base electrodes of said transistors.

4. A sawtooth oscillator comprising the combination of a pair of junction transistors of opposite conductivity types, each of said junction transistors having a base electrode and a pair of output electrodes, an inductance coil, means for connecting said inductance coil between an output electrode of one transistor and an output electrode of the other transistor, a current source, means for connecting said current source between the remaining output electrodes of said transistors, means for biasing each base electrode in the forward direction, and means for coupling the base electrode of each transistor to an output electrode of the other transistor.

5. Apparatus comprising the combination of a pair of normally conductive transistors each having a base electrode, an inductance, an energy source, means for coupling said inductance to said energy source through said transistors, and means coupled between said inductance and each of said base electrodes for periodically cutting off said bidirectional switch transistors whereby said inductance is periodically decoupled from said source.

6. Apparatus in accordance with claim 5 wherein said transistors are junction transistors of the p-n-p and n-p-n type respectively, and wherein said means for periodically cutting off said transistors includes means for deriving a pair of cutoff pulses of mutually opposite polarity from said inductance and means for applying each of said pair of pulses to a respectively different one of said base electrodes.

7. Apparatus comprising the combination of a pair of semiconductor devices each having a current path of controllable conductivity, an inductive load, a current source, biasing means for normally rendering both said current paths simultaneously conducting, said current paths being connected in series with said load and said source, and means coupled to said inductive load for periodically rendering both said current paths simultaneously non-conducting, the current flowing in said current paths periodically reversing in direction in response to the periodic rendering of said current paths non-conducting.

References Cited in the file of this patent

UNITED STATES PATENTS

| | | |
|---|---|---|
| 2,620,448 | Wallace | Dec. 2, 1952 |
| 2,666,818 | Shockley | Jan. 19, 1954 |
| 2,744,198 | Raisbeck | May 1, 1956 |

U. S. DEPARTMENT OF COMMERCE

PATENT OFFICE

CERTIFICATE OF CORRECTION

Patent No. 2,812,437 November 5, 1957

George C. Sziklai

It is hereby certified that error appears in the printed specification of the above numbered patent requiring correction and that the said Letters Patent should read as corrected below.

Column 5, line 61, strike out "as"; column 6, line 42, strike out "bidirectional switch".

Signed and sealed this 15th day of April 1958.

(SEAL)
Attest:

KARL H. AXLINE
Attesting Officer

ROBERT C. WATSON
Commissioner of Patents